United States Patent
Yoshino

(10) Patent No.: US 10,189,161 B2
(45) Date of Patent: Jan. 29, 2019

(54) CALIBRATION SYSTEM AND CALIBRATION METHOD CALIBRATING MECHANICAL PARAMETERS OF WRIST PART OF ROBOT

(71) Applicant: FANUC CORPORATION, Yamanashi (JP)

(72) Inventor: Kiyoshi Yoshino, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 110 days.

(21) Appl. No.: 15/298,808

(22) Filed: Oct. 20, 2016

(65) Prior Publication Data

US 2017/0113351 A1 Apr. 27, 2017

(30) Foreign Application Priority Data

Oct. 21, 2015 (JP) .................................. 2015-207224

(51) Int. Cl.
G06F 19/00 (2018.01)
B25J 9/16 (2006.01)

(52) U.S. Cl.
CPC ........... *B25J 9/1692* (2013.01); *B25J 9/1697* (2013.01)

(58) Field of Classification Search
CPC ............................. B25J 9/1692; B25J 9/1697
See application file for complete search history.

(56) References Cited

U.S. PATENT DOCUMENTS

| | | | |
|---|---|---|---|
| 6,425,865 B1 * | 7/2002 | Salcudean | A61B 8/0875 600/111 |
| 6,721,444 B1 | 4/2004 | Gu et al. | |
| 8,971,572 B1 * | 3/2015 | Yin | G06K 9/00355 345/173 |
| 2011/0029270 A1 * | 2/2011 | Mueglitz | B25J 9/1692 702/105 |
| 2011/0118753 A1 * | 5/2011 | Itkowitz | G06F 3/014 606/130 |
| 2017/0113351 A1 * | 4/2017 | Yoshino | B25J 9/1697 |

(Continued)

FOREIGN PATENT DOCUMENTS

| | | |
|---|---|---|
| JP | S 54-162565 A | 12/1979 |
| JP | H 01087182 A | 3/1989 |
| JP | 05008185 A | 1/1993 |

(Continued)

*Primary Examiner* — Ian Jen
(74) *Attorney, Agent, or Firm* — RatnerPrestia

(57) ABSTRACT

A calibration system able to calibrate mechanical parameters of a wrist part by a simpler manner is provided. The calibration system utilizes a target fastened at a predetermined position with respect to the joint closest to a hand of a robot and an imaging device set around the robot so as to calibrate the parameters of a mechanical model representing the wrist part of the robot. The posture of the target is changed from a predetermined initial position to generate a plurality of preliminary positions. Using these preliminary positions as starting points, the end point position of the robot whereby the target becomes a predetermined positional relationship with respect to the imaging device on the image obtained by capturing an image of the target is calculated. The calibration system uses the calculated end point position as the basis to calibrate the mechanical parameters of the wrist part.

6 Claims, 4 Drawing Sheets

(56) References Cited

U.S. PATENT DOCUMENTS

2017/0168586 A1* 6/2017 Sinha ..................... G06F 3/017
2018/0032144 A1* 2/2018 Horowitz ................ G06T 7/251

FOREIGN PATENT DOCUMENTS

| JP | H10049218 A | 2/1998 |
| JP | 2001-018182 A | 1/2001 |
| JP | 2001-105357 A | 4/2001 |
| JP | 2005125478 A | 5/2005 |
| JP | 2008-012604 A | 1/2008 |
| JP | 2011177845 A | 9/2011 |
| JP | 2013186088 A | 9/2013 |
| JP | 2015042437 A | 3/2015 |
| WO | 0057129 A1 | 9/2000 |

* cited by examiner

CALIBRATION SYSTEM AND CALIBRATION METHOD CALIBRATING MECHANICAL PARAMETERS OF WRIST PART OF ROBOT

BACKGROUND OF THE INVENTION

1. Field of the Invention

The present invention relates to a calibration system and calibration method calibrating mechanical parameters.

2. Description of the Related Art

In industrial robots, programming using teaching playback is being widely used. According to this method, a robot repeatedly moves to teaching positions taught by the program.

A robot controller utilizes a mechanical model mathematically representing a robot to perform numerical calculations and convert teaching positions of a program to command positions in a coordinate system of the robot. A mechanical model generally includes some error with respect to the actual mechanism of the robot. The position which the hand of the robot reaches will not perfectly match the command position. That is, if the error between the actual position reached by the hand and the command position is small, the positioning precision becomes higher.

The parameters included in a mechanical model (below, sometimes referred to as "mechanical parameters") include processing error or assembly error of the component parts of the robot and are unique values differing with each robot. Therefore, when the component parts of a robot are changed, unless adjusting the mechanical parameters, the positioning precision of the robot is liable to fall.

If marking component parts before replacing a motor, the method of adjusting the positions of the component parts so that the marks match after replacing the motor (below, sometimes referred to as the "mark reference method") is known.

Further, Japanese Patent. Publication No, 54-162565A discloses the method of forming a relief shape at the body of the robot and using a measuring apparatus to detect the position of the relief shape so as to determine an origin of an axis. Japanese Patent Publication. No. 1-087182A discloses the method of utilizing a light receiving device attached to the robot and a laser emitting part to calibrate an origin.

Japanese Patent Publication No. 2001-018182A discloses a method of measuring a 3D position of a front end position of a robot after change of posture of the robot to thereby calibrate the mechanical parameters. Japanese Patent Publication No. 2001-105357A discloses a method of utilizing the fact that a length of a wire attached to a hand of a robot changes along with a posture of the robot so as to calibrate the mechanical parameters. Japanese Patent Publication No. 2008-012604A discloses a method of making a robot move in accordance with a position of a target after change of the posture of the robot and a distance between a light receiving device and the target and calibrating the mechanical parameters from the results.

SUMMARY OF INVENTION

If replacing a motor or decelerator used for driving an axis, the above-mentioned mark reference method or other known method can be used to calibrate mechanical parameters relatively simply. However, if replacing a wrist part all together, unless adjusting the link length or other mechanical parameters of the wrist part, the positioning precision after replacement is liable to fall.

Therefore, it is necessary to move the robot to a location enabling a broad work space to be secured and calibrate the mechanical parameters of the robot as a whole. In the invention described in Japanese Patent Publication No. 2008-012604A, the position of the camera or target attached to the hand of the robot is unknown, so it is not possible to calculate error of the origin of the wrist axis and not possible to calibrate the mechanical parameters of the wrist part.

Therefore, a calibration system and calibration method able to calibrate mechanical parameters of a wrist part by a simpler manner have been sought.

According to the present invention, there is provided a calibration system calibrating parameters of a mechanical model representing a wrist part of a robot utilizing a target fastened at a hand of the robot at a predetermined position with respect to a joint closest to the hand and able to be changed in position and posture by the robot and an imaging device set around the robot, the calibration system including a preliminary position generating part using a position of the robot when arranged at a position where the target is included in a field of vision of the imaging device as an initial position and changing the posture of the target without changing the position of the target to generate a plurality of positions of the robot as a plurality of preliminary positions, a target detecting part using an image of the target at the image acquired by the imaging device as the basis to acquire information relating to the position of the target on the image and the distance between the target and the imaging device, an end point positron storing part using the plurality of preliminary positions as starting points, making the robot more translationally so that the positions of the target detected by the target detecting part become predetermined, positions and the distances become predetermined distance, and storing the positions of the robot after the translational movement as end points, and a parameter calculating part using positions of end points stored by the end point position storing part as the basis to calculate the parameters of the mechanical model.

In a preferred embodiment, the parameter calculating part is configured to calculate parameters in accordance with the method of optimization of nonlinear functions.

In a preferred embodiment, the target detecting part is configured to use geometric features including length information of the target as the basis to calculate the distance.

In a preferred embodiment, the target detecting part is configured to use light generated from the target as the basis to detect the position of the target and the distance.

In a preferred embodiment, the target detecting part is configured to use a 2D image acquired by the imaging device as the basis to detect the position of the target and the distance.

In a preferred embodiment, there is provided a calibration method calibrating parameters of a mechanical model representing a wrist part of a robot utilizing a target fastened at a hand of the robot at a predetermined position with respect to a joint closest to the hand and able to be changed in position and posture by the robot and an imaging device set around the robot, the calibration method including using a position of the robot when arranged at a position where the target is included in a field of vision of the imaging device as an initial position and changing the posture of the target without changing the position of the target to generate a plurality of positions of the robot as a plurality of preliminary positions, using an image of the target at the image acquired by the imaging device as the basis to acquire information relating to the position of the target on the image and the distance between the target and the imaging device, using the plurality of preliminary positions as starting points, making the robot move translationally so that the positions of the detected target become predetermined positions and the distances become predetermined distance, and storing the positions of the robot after the translational movement as end points, and using positions of stored end points as the basis to calculate the parameters of the mechanical model.

BRIEF DESCRIPTION OF DRAWINGS

These and other objects, features, and advantages of the present invention will become clearer by referring to the detailed description of illustrative embodiments of the present invention shown in the attached drawings.

DETAILED DESCRIPTION

Below, embodiments of the present invention will be explained with reference to the attached drawings. The component elements in the illustrated embodiments are suitably changed in scale for assisting understanding of the present invention. Further, the same or corresponding component elements use the same reference notations.

Figure 1:
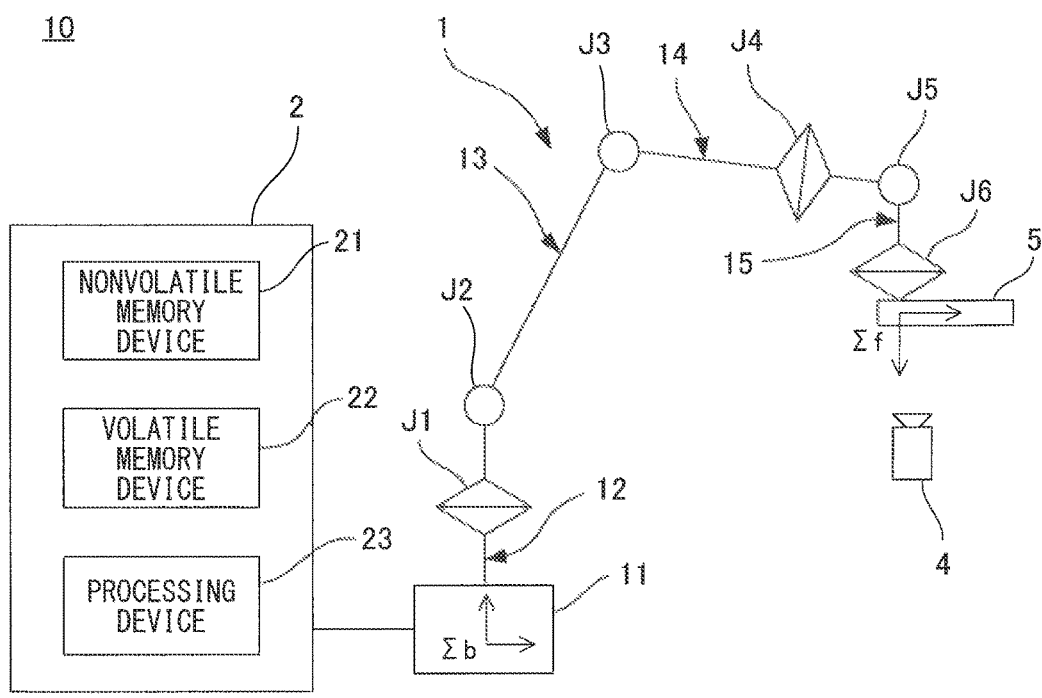
FIG. 1 is a view showing an example of the configuration of a robot system according to one embodiment.
Figure 2:
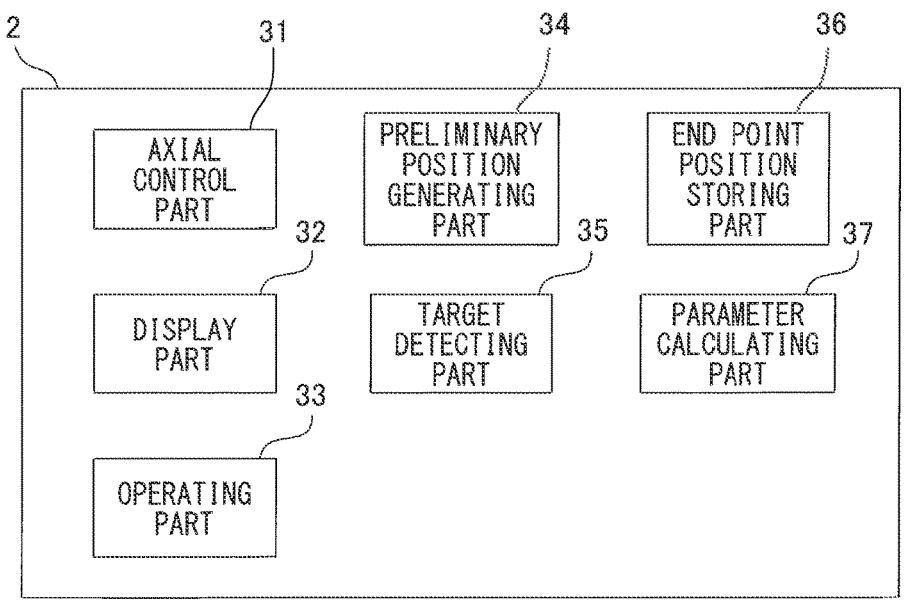
FIG. 2 is a functional block diagram of a robot controller.

Referring to FIG. 1 and FIG. 2, a calibration system according to an embodiment of the present invention will be explained. FIG. 1 shows a robot system 10 including a robot 1, a robot controller 2 controlling the robot 1, and an imaging device 4.

The robot 1 is a six-axis vertical multi-articulated robot including a base 11, turning turret 12, lower arm 13, upper arm 14, and wrist part 15. The robot 1 has joints J1 to J6. It is configured to enable the joints J1 to J6 to be driven by motors (not shown) to thereby position an end effector attached to the wrist part 15 by a desired posture to a desired position. The configuration and mechanism of such a robot 1 are known, so will not explained in detail in this Description.

The robot 1 is connected to the robot controller 2 through a known cable or wireless communicating means. The robot controller 2 includes components connected to each other by a bus such as a nonvolatile memory device 21, volatile memory device 22, and processing apparatus 23.

The nonvolatile memory device 21 stores a control program for controlling the robot 1, a calculation program for calibrating the mechanical parameters of the robot 1, etc.

The volatile memory device 22 is used to temporarily store the calculation program etc. read from the nonvolatile memory device 21.

The processing apparatus 23 is a CPU of a robot controller 2 and performs various processing in accordance with the program stored in the volatile memory device 22.

The robot controller 2 includes an interface (not shown) connected to an external device, for example, an input device and display device.

The wrist part 15 of the robot 1 has a target 5 whose image is to be captured by the imaging device 4 as an end effector. The target 5 is fastened to the wrist part 15 so that its position and posture changes linked with operation of the robot 1.

The target 5 is a plate-shaped member given a pattern of a plurality of circles at its surface as geometric features. These circles are arranged in a lattice manner with center positions separated from each other by exactly predetermined distances. The target 5 is attached at a predetermined position with respect to the joint J6 closest to the hand of the robot 1. That is, the position of the target 5 with respect to the joint J6 and in turn the position of the center of each circle are known in advance.

The geometric features given to the target 5 are not limited to the above-mentioned pattern of circles. The geometric features may also be other shapes enabling a specific representative point to be imagined, for example, polygonal shapes, or may be 3D shapes. Alternatively, light emitting diodes or other light emitting devices may be used to give the geometric features to the target 5. The array of geometric features is not limited to a lattice type array. Another array having a certain regularity, for example, a zigzag array, is also possible.

Figure 3:
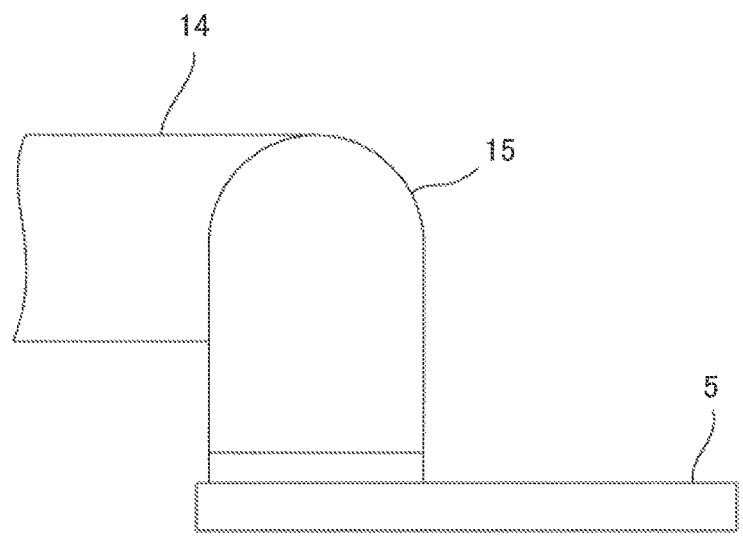
FIG. 3 is an enlarged view showing a wrist part to which a target is attached.
Figure 4:
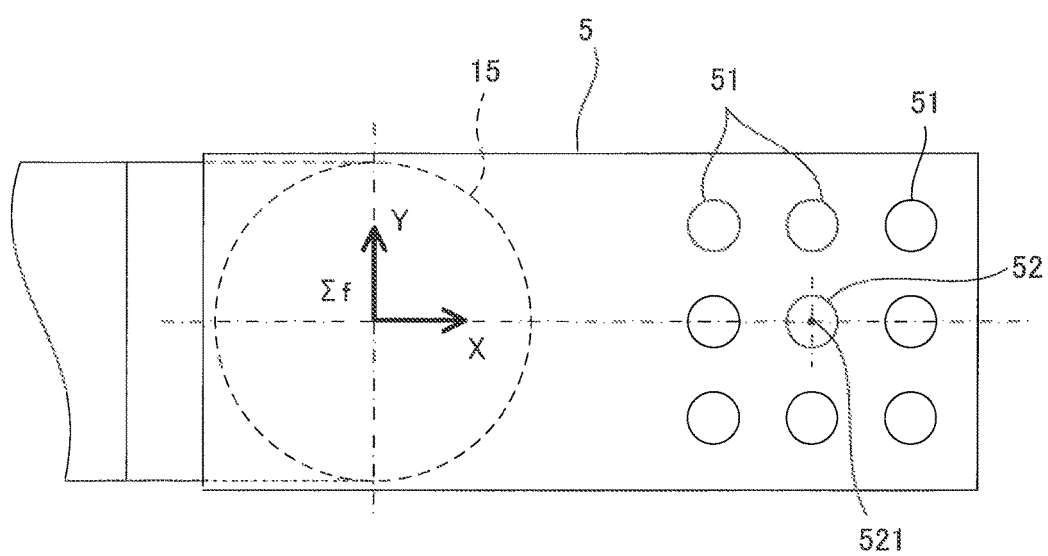
FIG. 4 is an enlarged view showing a target seen from the imaging device side.

FIG. 3 is an enlarged view showing enlarged a wrist part 15 to which the target 5 is attached. FIG. 4 is an enlarged view showing the target 5 seen from the side of the imaging device 4.

As shown in FIG. 4, the target 5 is given geometric features comprised of a pattern of nine circles 51 arranged at equal intervals. The representative point of the geometric features may be suitably set, but in the present embodiment is set at the center 521 of a representative circle 52 arranged at the center of the nine circles 51.

The center 521 of the representative circle 52 is arranged on the XZ plane of a mechanical interface coordinate system Σf set with respect to the wrist part 15. The mechanical interface coordinate system Σf is a coordinate system which has the intersection of the axis of rotation of the joint J6 and the mounting surface of the wrist part. 15 to which the target 5 is attached as the origin, has the direction parallel to the axis of rotation of the joint J6 and moving away from the mounting surface as the positive direction of the z-axis, and has the direction extending parallel to the mounting surface and at an angle with respect to axis of rotation of the joint J6 of zero degree as the positive direction of the x-axis. However, it should be noted that the 52 is not limited to the above-mentioned example.

The imaging device 4 has the function, of capturing an image of an object to detect a 2D image at the light receiving surface. The imaging device 4 is a CCD camera including, for example, a lens having a predetermined focal distance.

The robot controller 2 has the function of a calibration system for calibrating the mechanical parameters of the robot 1. Below, the function of the robot controller 2 as a calibration system will be explained.

FIG. 2 is a functional block diagram of the robot controller 2. As shown in FIG. 2, the robot controller 2 includes an axial control part 31, display part 32, operating part 33, preliminary position generating part 34, target detecting part 35, end point position storing part 36, and parameter calculating part 37.

The axial control part. 31 generates commands for controlling the joints J1 to 36 of the robot 1. The display part 32 displays information relating to the robot 1 through a display device connected to the robot controller 2. The operating part 33 is connected to an input device operated by the operator and generates, edits, or otherwise processes data corresponding to the content of the operation.

The preliminary position generating part 34 uses the position of the robot 1 when arranged at a position where the target 5 is included in the field of vision of the imaging device 4 as the initial position and changes the posture of the target without changing the position of the target 5 to generate a plurality of positions of the robot 1 as a plurality of preliminary positions.

The target detecting part 35 uses the image of the target 5 on the image acquired by the imaging device 4 as the basis to acquire information relating to the position of the target 5 on the image and the distance between the target 5 and the imaging device 4.

In one embodiment, the target detecting part 35 may be configured to use geometric features including length information of the target 5 as the basis to calculate the distance between the target 5 and the imaging device 4. Further, in one embodiment, the target detecting part 35 may be configured to use the 2D image acquired by the imaging device 4 as the basis to detect the position of the target 5 and the distance between the target 5 and imaging device 4.

Further, in the case of an embodiment where the geometric features of the target 5 are given by light emitting devices, the target detecting part 35 can be configured to use the light generated from the target 5 as the basis to detect the position of the target 5 and the distance between the target 5 and imaging device 4.

The end point position storing part 36 uses the plurality of preliminary positions generated by the preliminary position generating part 34 as starting points, makes the robot 1 move translationally so that the positions and distances of the target 5 detected by the target detecting part 35 approach predetermined positions and distances, and stores the positions of the robot 1 after translational movement.

The parameter calculating part 37 uses positions of end points stored by the end point position storing part 36 as the basis to calculate the parameters of the mechanical model of the wrist part 15. In one embodiment, the parameter calculating part 37 may be configured to calculate the mechanical parameters of the wrist part 15 in accordance with the method of optimization of nonlinear functions.

Figure 5:
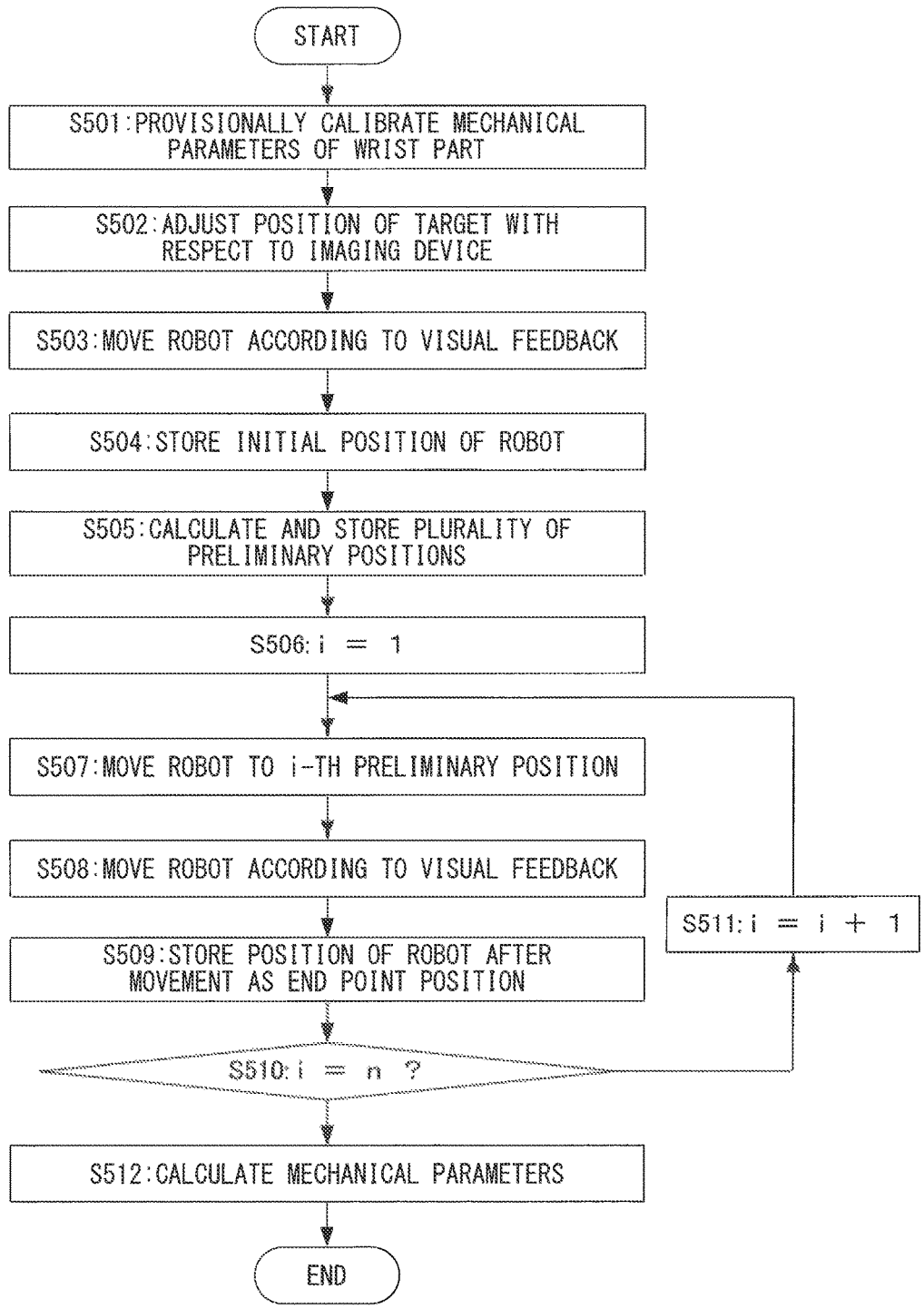
FIG. 5 is a flow chart showing a flow of processing performed by a calibration system according to one embodiment.

Referring to FIG. 5, the flow of processing performed by the robot controller 2 will be explained.

At step S501, the mechanical parameters of the wrist part 15 of the robot 1 are provisionally calibrated. For example, the origin position of the joint of the wrist part 15 is made to move to near the origin position by visual examination, the position after movement is set as the provisional origin, and the provisional origin is stored as the nonvolatile memory device 21. In the case of a parameter value showing the link length and other mechanical parameters with small extents of change before and after replacement of the wrist part 15, it is possible to use the same value as before replacement as the provisional parameter value.

At step S502, the robot 1 is operated to adjust the positional relationship between the target 5 and the imaging device 4 so that the imaging device 4 can be used to capture an image of the geometric features of the target 5. The position of the target 5 with respect to the imaging device 4 does not have to be a specific position. It is sufficient that the target 5 be in the range of the field of vision of the imaging device 4. Even if the work space is limited by a peripheral apparatus, a suitable position in the work space is freely selected. For this reason, there is no need for movement of the installed position of a peripheral apparatus or the robot 1.

At step S503, the robot 1 is made to operate in accordance with the visual feedback. The detailed processing of step S503 will be explained with reference to FIG. 6.

At step S601, the geometric features of the target 5 attached to the wrist part 15 (see FIG. 4) are captured by the imaging device 4.

At step S602, the target detecting part 35 acquires the position of a representative point of the geometric features at the image obtained by capturing the target 5 (for example, the center 521 of the representative circle 52 shown in FIG. 4). The position of the representative point is acquired as a relative position with respect to a predetermined position on the image. In one embodiment, the position of the representative point acquired at step S502 may also be a position with respect to the center point of the light receiving surface. The positional relationship on the image is calculated in accordance with how many "pixels" in the vertical direction and horizontal direction of the image expressed as a 2D plane the distance between the points corresponds to.

At step S603, the target detecting part 35 acquires the distance between the imaging device 4 and the representative point of the target 5. On the image obtained by capturing the geometric features of the target 5, if the imaging device 4 and the target 5 do not directly face each other, the circles forming the geometric features are expressed as ellipses. Considering this, the distance between the position of the center 521 of the representative circle 52 on the image and the position of the center of a circle 51 adjoining the representative circle 52 is detected. The method of image processing may use any known technique, so a detailed explanation will be omitted in this Description.

The distance between centers of ellipses on the image, the length of one side of a predetermined pixel, the distance between centers of a predetermined actual circle 51 and a representative circle 52, and the focal distance of the lens of the imaging device 4 are used as the basis to calculate the distance between the target 5 and the imaging device 4. The method of calculation according to the known pinhole camera model can be applied, so in this Description, a detailed explanation will be omitted.

At step S604, the amount of operation of the robot 1 is calculated so that the relative positional relationship calculated at step S602 and the distance calculated at step S603 become a predetermined target position and target distance, respectively. As the target position and target distance, it is possible to use values stored in the nonvolatile memory device 21. Specifically, the amount of operation of the robot 1 is calculated in accordance with the difference between the calculated position and the target position and the difference between the calculated distance and the target distance so that the difference of these becomes a predetermined value or less.

At step S605, the robot 1 is made to operate in accordance with the amount of operation calculated at step S604.

Figure 6:
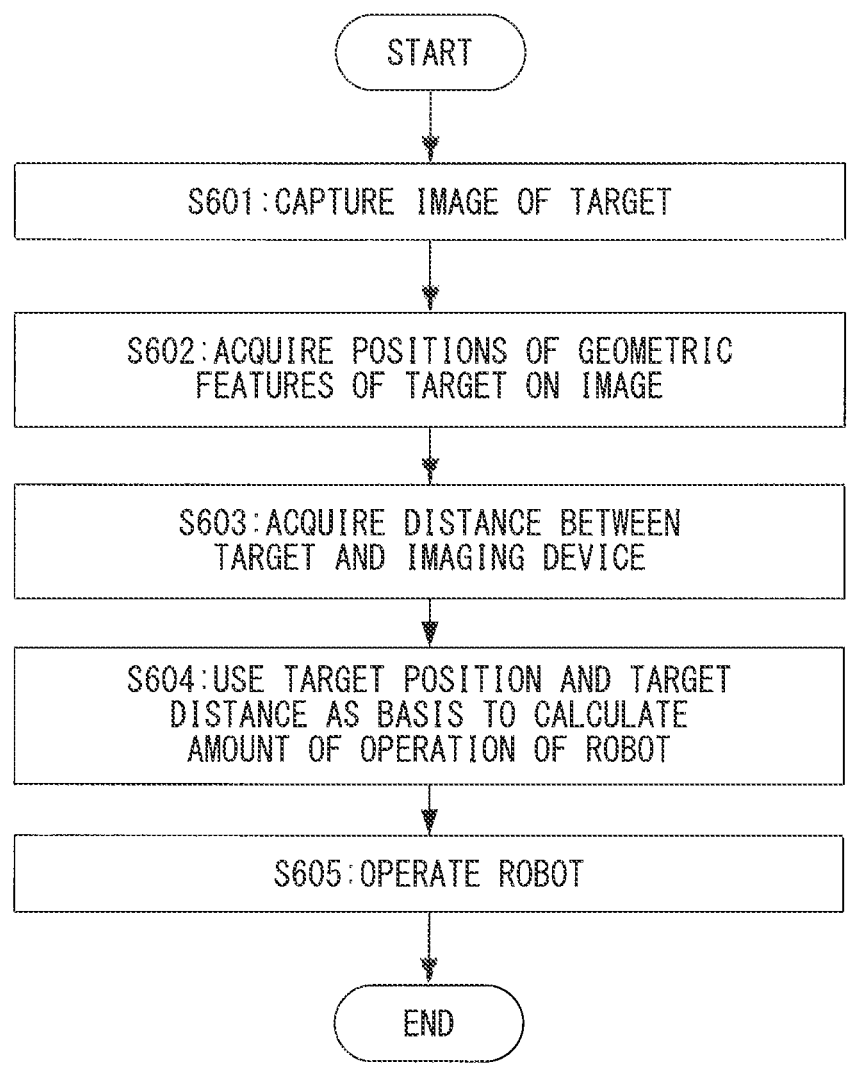
FIG. 6 is a flow chart showing a flow of processing utilizing visual feedback.

Operational control of the robot utilizing the visual feedback explained with reference to FIG. 6 is known. For example, the method described in Japanese Patent Publication No. 2008-012604A can be applied.

If making the robot operate utilizing visual feedback, the target 5 is measured using the imaging device 4 in a noncontact manner. Therefore, no wear of the target 5 etc occurs, so the precision of the result of calculation is not liable to fall along with time.

Further, the position of the robot after the operation is automatically calculated by the processing apparatus 23, so the end point position of the robot can be precisely acquired. Further, there is no need for a worker to approach the robot during the operation of the robot, so the safety of the worker can be secured and the load on the worker can be reduced.

Returning to FIG. 5, at step S504, the position of the robot 1 after operation is stored as the initial position in the nonvolatile memory device 21.

At step S505, the preliminary position generating part 34 calculates a plurality of preliminary positions and stores them in the nonvolatile memory device 21. The plurality of preliminary positions are obtained by changing the posture of the target 5 without changing the position of the representative point of the geometric features corresponding to the initial position of the robot 1.

At step S506, "1" is input for the count "i".

At step S507, the robot 1 is made to operate to the i-th preliminary position. As explained above, in the operation up to the preliminary position, the position of the representative point is not changed from the state of the initial position. Therefore, the range of operation of the robot 1 becomes smaller, so even if the work area is limited, the processing of step S507 can be safely performed.

At step S508, in the same way as step S503, the robot 1 is made to move in accordance with the visual feedback.

At step S509, the end point position storing part 36 stores the position of the robot 1 after operation in the nonvolatile memory device 21 as the end point position.

At step S510, the numerical value "i" and the number "n" of the preliminary position are compared. If it is judged that "i=n" does not stand, the routine proceeds to step S511 where "i+1" is input for the count "i", then the routine proceeds to step S507.

On the other hand, when it is judged at step S510 that "i=n" stands, the routine proceeds to step S512. At step S512, the parameter calculating part 37 uses the "n" number of end point positions as the basis to calculate the mechanical parameters of the wrist part 15, then ends the calibration processing.

Next, the method of calculation of the mechanical parameters of the robot 1 will be explained. According to the present embodiment, the error of the mechanical parameters at a plurality of postures is calculated and the mechanical parameters are calibrated so that the error becomes smaller.

The next three errors are considered as errors of the mechanical parameters. The first error is the np number of mechanical parameters $P_{k,0}[P_{k,0,1}, P_{k,0,2}, \ldots, P_{k,0,np}]$ including the origin position of the axis of rotation and the link length of the wrist part 15. The mechanical parameters $P_{k,0}$ may include other mechanical parameters of the robot 1 in addition to the mechanical parameters of the wrist part 15.

The second error is error of a position $P_S=[X_S, Z_S]$ of a representative point in the mechanical interface coordinate system $\Sigma f$. As explained above, the mechanical interface coordinate system $\Sigma f$ is a coordinate system fastened to a mounting part of a target 5 attached to a hand of a robot 1. In the second error, the $Y_S$ of the Y-axial component is not considered. The rotational direction of the axis of rotation of the joint J6 closest to the hand chances in accordance with the Y-axial component $Y_S$ of $P_S$, so unless making $\Delta Y_s=0$, the origin of the axis of rotation cannot be unambiguously identified.

The third error is error of the position $P_m=[X_m, Y_m, Z_m]$ of a representative point in the base coordinate system $\Sigma b$. The base coordinate system $\Sigma b$ is the coordinate system fastened to the base 11 of the robot 1.

The first error, second error, and third error will be defined as the mechanical parameter error $$P_{ID}=[\Delta P_{k,0}, \Delta P_S, \Delta P_m].$$

In the ideal state, that is, when all of the components of $P_{ID}$ are zero, the position $P_i$ of the representative point at the base coordinate system $\Sigma b$ calculated using the stored i-th end point position of the robot 1 and the position $P_S$ of the representative point at the mechanical interface coordinate system $\Sigma f$ and the position $P_m$ of the representative point at the base coordinate system $\Sigma b$ calculated using the initial position of the robot 1 and the position $P_S$ of the representative point at the mechanical interface coordinate system $\Sigma f$ should perfectly match. However, usually, due to the mechanical parameter error $P_{ID}$, a positional error $e_i$ represented by the following formula (1) arises between the positions $P_i$ and $P_m$ of the representative points.

$$e_i=P_i-P_m \quad \text{Formula (1)}$$

As will be understood from the geometric relationship, $P_i$ is a function of $P_{ID}$. Therefore, $e_i$ is also a function of $P_{ID}$.

In this embodiment, using the Newton-Raphson method, the $P_{ID}$ giving the smallest error $E=[e_1, e_2, \ldots, e_{ns}]$ between the position $P_i$ of the representative point at the base coordinate system $\Sigma b$ at the ns number of measurement positions/postures and the position $P_m$ of the representative point at the base coordinate system $\Sigma b$ at the initial position is found. In this calculation, first, as shown in the next formula (2), the differential value $g_{i,j}$ for the j-th identification parameter $P_{ID,j} e_i$ is found.

$$g_{i,j} = \frac{\partial e_i}{\partial P_{ID,j}} = \frac{e'_{i,j} - e_i}{\Delta P_{ID,j}} \quad \text{Formula (2)}$$

Here, $e'_{i,j}$ is the error between the position. $P'_I$ of a representative point at the base coordinate system $\Sigma b$ at the i-th end point position of the robot 1 when adding the slight error amount $\Delta P_{ID,j}$ to $P_{ID,j}$ and the position $P_m$ of a representative point at the base coordinate system $\Sigma b$ at the initial position.

If assuming $P_{ID}$ includes ne number of parameters, $g_{i,j}$ found using formula (2) is expressed by the matrix $[G]$ (see formula (3)):

$$[G] = \begin{bmatrix} g^T_{1,1} & \cdots & g^T_{1,j} & \cdots & g^T_{1,ne} \\ \vdots & & \vdots & & \vdots \\ g^T_{i,1} & \cdots & g^T_{i,j} & \cdots & g^T_{i,ne} \\ \vdots & & \vdots & & \vdots \\ g^T_{ns,1} & \cdots & g^T_{ns,j} & \cdots & g^T_{ns,ne} \end{bmatrix} \quad \text{Formula (3)}$$

By using this matrix $[G]$, the error relationship is expressed by the following linear formula (4):

$$E^T=[G]P_{ID}^T \quad \text{Formula (4)}$$

Therefore, $P_{ID}$ is found from the following formula (5).

$$P_{ID}^T=[G]^+E^T \quad \text{Formula (5)}$$

Here, $[G]^+$ is a pseudo inverse matrix of $[G]$ and is found from the following formula (6).

$$[G]^+=([G]^T[G])^{-1}[G]^T \quad \text{Formula (6)}$$

From the above, the mechanical parameters $P_{k,1}$ are found from the following formula (7).

$$P_{k,1} = P_{k,0} + P_{ID} \quad \text{Formula (7)}$$

There is nonlinearity in the relationship between $P_{ID}$ and $P_i$, so $P_{k,1}$ found from formula (7) continues to include error. Therefore, in accordance with the Newton-Raphson method, using $P_{k,1}$ instead of $P_{k,0}$, the calculations from formula (1) to formula (7) are repeated until all components of $P_{ID}$ become sufficiently small. In actuality, the above calculations are repeated until the components of $P_{ID}$ become predetermined threshold values or less. As another method of calculation used for calibration, there are the genetic algorithm, neural network, and other methods of optimization of nonlinear problems. All are known methods, so detailed explanations will be omitted in this Description.

Among the steps for calibrating the mechanical parameters of the wrist part 15 of the robot 1, the only ones which the worker has to perform are steps S501 and S502. The steps from step S503 and on can be automated. Further, it is not necessary to move the robot 1 to another location to calibrate it. Therefore, the load on the worker can be lightened.

According to the calibration system and calibration method according to the present embodiment, the following effects are obtained.

(1) Even if the surrounding environment limits the range of operation of the robot. 1, the mechanical parameters of the wrist part 15 can be calibrated.

(2) The mechanical parameters of the wrist part 15 are calibrated by calculation automatically. Therefore, regardless of the skill of the worker, the mechanical parameters can be calibrated quickly and reliably. The load on the worker can also be lightened.

(3) It is not necessary to apply marks etc. at the robot 1 in advance to calibrate the mechanical parameters. Therefore, the calibration system and calibration method according to the present embodiment can be applied to any type of robot.

(4) When performing the calibration, there is no longer a need for a worker to perform work near the robot 1, so the safety of the worker can be secured.

(5) A noncontact method may be used to calibrate the mechanical parameters, so it is possible to prevent a drop in measurement precision due to wear of the parts.

(6) The mechanical parameters of the wrist part 15 as a whole can be calibrated. Therefore, it is possible to prevent a drop in the positioning precision of the robot 1 when replacing the wrist part 15.

The size of the operating area of the robot 1 demanded when calibrating the mechanical parameters of the wrist part 15 was compared between the calibration system according to the present embodiment and the calibration system according to the comparative example.

As an index representing the size of the operating area, the range (area) of operation of the origin of the mechanical interface coordinate system $\Sigma f$ with respect to the horizontal direction is used. In other words, the area of the range in which the origin, of the mechanical interface $\Sigma f$ moves seen from above the robot 1 can be used as the basis to evaluate the size of the operating area.

In the robot system according to a comparative example, as described in Japanese Patent Publication No. 2008-012604A, the imaging device is fastened to the hand of the robot and the target is set around the robot. For example, the imaging device is arranged at the position of (x, y, z)=(250, 0, 10) in the mechanical interface coordinate system $\Sigma f$, while the target is set at the position (x, y, z)=(1800, 0, 1300) in the base coordinate system $\Sigma b$.

Furthermore, the imaging device is positioned so that the target and the imaging device face each other separated by about 400 mm and the optical axis of the imaging device passes through the representative point, of the target. The optical axis of the imaging device is slanted by ±30 degrees about the X-axis and Y-axis of the base coordinate system $\Sigma b$ and by ±45 about the Z-axis to set a total of eight measurement positions/postures. In this case, when performing the calibration processing, the size of the range of movement of the hand in the horizontal direction becomes equal to the area of a circle with a radius of about 432 mm.

On the other hand, in the robot system according to the embodiment, the imaging device 4 is set around the robot 1 while the target 5 is fastened at the wrist part 15 of the robot 1. The representative point of the target is arranged at the position of (x, y, z)=(250, 0, 10) in the mechanical interface coordinate system $\Sigma f$. Further, the target 5 and the imaging device 4 face each other separated by about 400 mm. The optical axis of the imaging device is slanted by ±30 degrees about the X-axis and Y-axis of the base coordinate system $\Sigma b$ and by ±45 about the Z-axis to set a total of eight preliminary positions. In this case, when performing the calibration processing, the size of the range of movement, of the hand in the horizontal direction becomes equal to the area of a circle with a radius of 221 mm.

In this way, according to the present embodiment, even if calibrating mechanical parameters under the same conditions, the size of the operating range can be reduced about 74% compared with the case of a comparative example. Therefore, according to the present embodiment, the mechanical parameters of the wrist part can be calibrated even in an environment with restricted work space.

The case of use of a robot having a mechanism in which all joints are revolute was explained, but similar explanations apply even in the case of a robot in which the joints are prismatic if reading axial angles as axial positions.

Above, various embodiments of the present invention were explained, but a person skilled in the art would recognize that other embodiments as well may be used to realize the actions and effects intended by the present invention. In particular, the component elements of the embodiments explained above can be deleted or replaced without departing from the scope of the present invention and known means can be further added. Further, the fact that the features of the plurality of embodiments which are explicitly or implicitly disclosed in this specification can also be freely combined so as to work the present invention is self evident to a person skilled in the art.

According to the calibration system and calibration method according to the present invention, it is possible to use information on an image obtained by capturing by an imaging device a target wrist part fastened to a hand of a robot as the basis to calculate mechanical parameters, so it is possible to calibrate the mechanical parameters in a simple manner.

What is claimed is:

1. A calibration system calibrating parameters of a mechanical model representing a wrist part of a robot utilizing a target fastened at a hand of the robot at a predetermined position with respect to a joint closest to the hand, the target being able to be changed in position and posture by the robot, and an imaging device set around the robot, the calibration system comprising:

a preliminary position generating part using a position of the robot when the target is arranged at a position where the target is included in a field of vision of the imaging device as an initial position and changing the posture of the target without changing the position of the target to generate a plurality of positions of the robot as a plurality of preliminary positions, a target detecting part using an image of the target at the image acquired by the imaging device as the basis to acquire information on the position of the target on the image and the distance between the target and the imaging device, an end point position storing part using the plurality of preliminary positions as starting points, making the robot move translationally so that the positions of the target detected by the target detecting part become predetermined positions and the distances become predetermined distance, and storing the positions of the robot after the translational movement as end points, and a parameter calculating part using the positions of the end points stored by the end point position storing part as the basis to calculate the parameters of the mechanical model.

2. The calibration system according to claim wherein the parameter calculating part is configured to calculate parameters in accordance with the method of optimization of nonlinear functions.

3. The calibration system according to claim wherein the target detecting part is configured to use geometric features including length information of the target as the basis to calculate the distance.

4. The calibration system according to claim 1, wherein the target detecting part is configured to use light generated from the target as the basis to detect the position of the target and the distance.

5. The calibration system according to claim 1, wherein the target detecting part is configured to use a 2D image acquired by the imaging device as the basis to detect the position of the target and the distance.

6. A calibration method calibrating parameters of a mechanical model representing a wrist part of a robot utilizing a target fastened at a hand of the robot at a predetermined position with respect to a joint closest to the hand, the target being able to be changed in position and posture by the robot and an imaging device set around the robot, the calibration method comprising:

using a position of the robot when arranged at a position where the target is included in a field of vision of the imaging device as an initial position and changing the posture of the target without changing the position of the target to generate a plurality of positions of the robot as a plurality of preliminary positions, acquiring information on the position of the target on the image and the distance between the target and the imaging device based on an image of the target at the image acquired by the imaging device, using the plurality of preliminary positions as starting points, making the robot move translationally so that the positions of the detected target become predetermined positions and the distances become predetermined distance, and storing the positions of the robot after the translational movement as end points, and calculating the parameters of the mechanical model based on the positions of the stored end points.

* * * * *

UNITED STATES PATENT AND TRADEMARK OFFICE
CERTIFICATE OF CORRECTION

PATENT NO. : 10,189,161 B2
APPLICATION NO. : 15/298808
DATED : January 29, 2019
INVENTOR(S) : Kiyoshi Yoshino Page 1 of 1

It is certified that error appears in the above-identified patent and that said Letters Patent is hereby corrected as shown below:

In the Claims

Claim 2, Column 11, Line 22, insert --1,-- after according to claim.

Claim 3, Column 11, Line 26, insert --1,-- after according to claim.

Signed and Sealed this
Fourth Day of June, 2019

Andrei Iancu
*Director of the United States Patent and Trademark Office*